(12) United States Patent
Davis

(10) Patent No.: US 6,885,305 B2
(45) Date of Patent: Apr. 26, 2005

(54) SYSTEM FOR LOCATING AND SENDING MESSAGES TO PETS

(76) Inventor: Richard David Davis, 125 Nakhal Mesar Street, P.O. Box 233, Mitzepe Ramon (IL)

( * ) Notice: Subject to any disclaimer, the term of this patent is extended or adjusted under 35 U.S.C. 154(b) by 0 days.

(21) Appl. No.: 10/064,574

(22) Filed: Jul. 28, 2002

(65) Prior Publication Data
US 2004/0017296 A1 Jan. 29, 2004

(51) Int. Cl.⁷ ............................................. G08B 23/00
(52) U.S. Cl. ............................... 340/573.3; 340/573.1; 340/539.1; 340/692
(58) Field of Search .................. 340/573.3, 573.1, 340/573.4, 539.1, 539.15, 692, 572.1

(56) References Cited

U.S. PATENT DOCUMENTS

| | | | | |
|---|---|---|---|---|
| 3,843,841 A | * | 10/1974 | Rubinstein | 379/38 |
| 4,745,882 A | * | 5/1988 | Yarnall et al. | 119/721 |
| 4,967,696 A | * | 11/1990 | Tobias | 119/719 |
| 5,207,179 A | * | 5/1993 | Arthur et al. | 119/721 |
| 5,337,041 A | * | 8/1994 | Friedman | 340/573.4 |
| 5,355,839 A | * | 10/1994 | Mistry | 119/858 |
| 5,872,516 A | * | 2/1999 | Bonge, Jr. | 340/573.3 |
| 6,003,473 A | * | 12/1999 | Printz | 119/859 |
| 6,369,698 B1 | * | 4/2002 | Valente | 340/573.1 |
| 6,396,403 B1 | * | 5/2002 | Haner | 340/573.4 |
| 6,661,344 B1 | * | 12/2003 | Bowling | 340/573.3 |

* cited by examiner

Primary Examiner—Phung Nguyen
(74) Attorney, Agent, or Firm—Richard D. Fuerle

(57) ABSTRACT

Messages can be sent to a pet using a hand-held remote transmitter and a receiver that is attached to the pet. The receiver can record voice commands. When the transmitter sends a signal, the receiver picks up the signal and plays the recorded command to the pet. The receiver can also have one or more lights mounted on it that can be turned on by pushing buttons on the transmitter.

20 Claims, 5 Drawing Sheets

SYSTEM FOR LOCATING AND SENDING MESSAGES TO PETS

CROSS REFERENCE TO RELATED APPLICATIONS

Priority is claimed from Israeli patent application Serial No. 144614, filed Jul. 29, 2001.

BACKGROUND OF INVENTION

This invention relates to a system that can locate and send messages to a pet. In particular, it relates to an electronic leash that includes LED's (light emitting diodes) and/or a digital recording system with several recording channels.

People who have pets, such as a dog or a cat, may let it wander unleashed outside at times. The owner may not always be able to see the pet and the pet may roam beyond the owner's voice. Electronic collars have been developed that will give the pet a shock to induce it to return home or otherwise change its behavior. However, many pet owners consider electric shocks to be cruel to their pet.

SUMMARY OF INVENTION

In this invention, a combination of a single and/or multi-channel recording system that includes an audio system and/or LED illumination together with a control system that is operated by radio transmitter is used to deliver an order by code or digital code to a pet. The receiving portion of the system is installed on the pet's leash to transfer vocal messages directly to the pet's ears and/or to locate the pet at night by turning on lights on the receiver using the remotely controlled transmitter.

Unlike prior systems for controlling pets, the system of this invention does not cause the pet any discomfort or pain.

DETAILED DESCRIPTION

Figure 1:
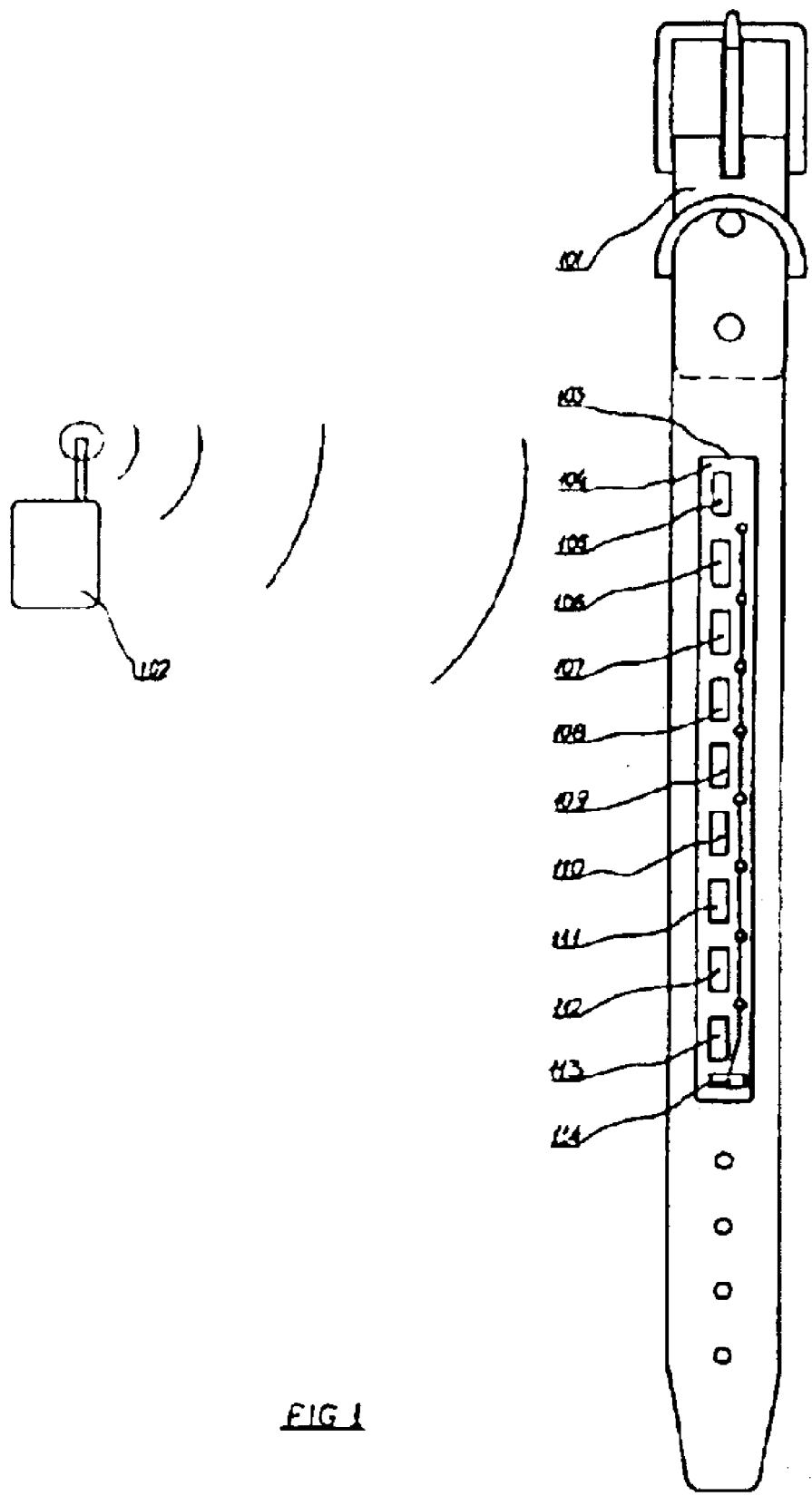
FIG. 1 is a view of a certain presently preferred embodiment of the system of this invention, showing the transmitter and the receiver.

Referring to FIG. 1, the system includes a receiver 101, in this case a collar for an animal such as a dog or cat, and a remote control panel 102. The collar 101 is made of a thick belt (e.g., a leather belt) that has a slot 103 where a flexible printed circuit board 104 is placed. Power supply 105, such as a battery, switch 106, receiver 107, microprocessor 108, decoder 109, chip 110 for storing audio commands, microphone 111, amplifier 112, loudspeaker 113, and LED 114 are placed on printed circuit board 104. There is also an antenna (not shown) inside collar 101.

Figure 2:
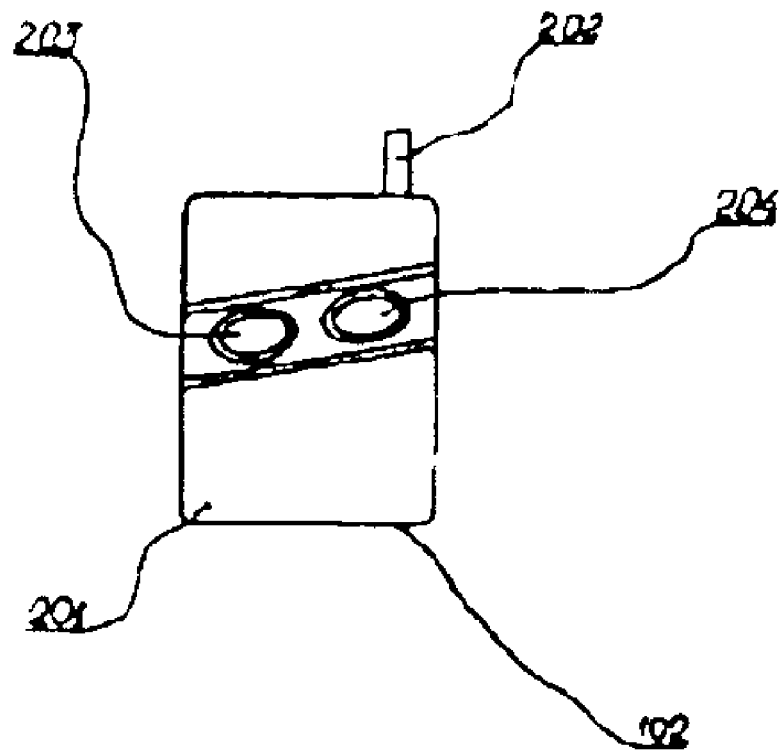
FIG. 2 is a plan view of a transmitter for the system of this invention.

Referring to FIG. 2, transmitter 102 consists of case 201, antenna 202, and pushbuttons 203 and 204 for entering code combinations so that encoded radio signals can be broadcast and received by receiver 101. Transmitter 102 can transmit at least one signal and can preferably transmit at least 2 signals, one to turn on a recording on receiver 101 and the other to turn on lights 114 on receiver 101. Transmitter 102 can be powered by a battery or other means. The number of pushbuttons can vary as desired. The system can be delivered to the user without any commands stored and the user can store the desired commands so that the pet will recognize the commands when they are played.

Figure 3:
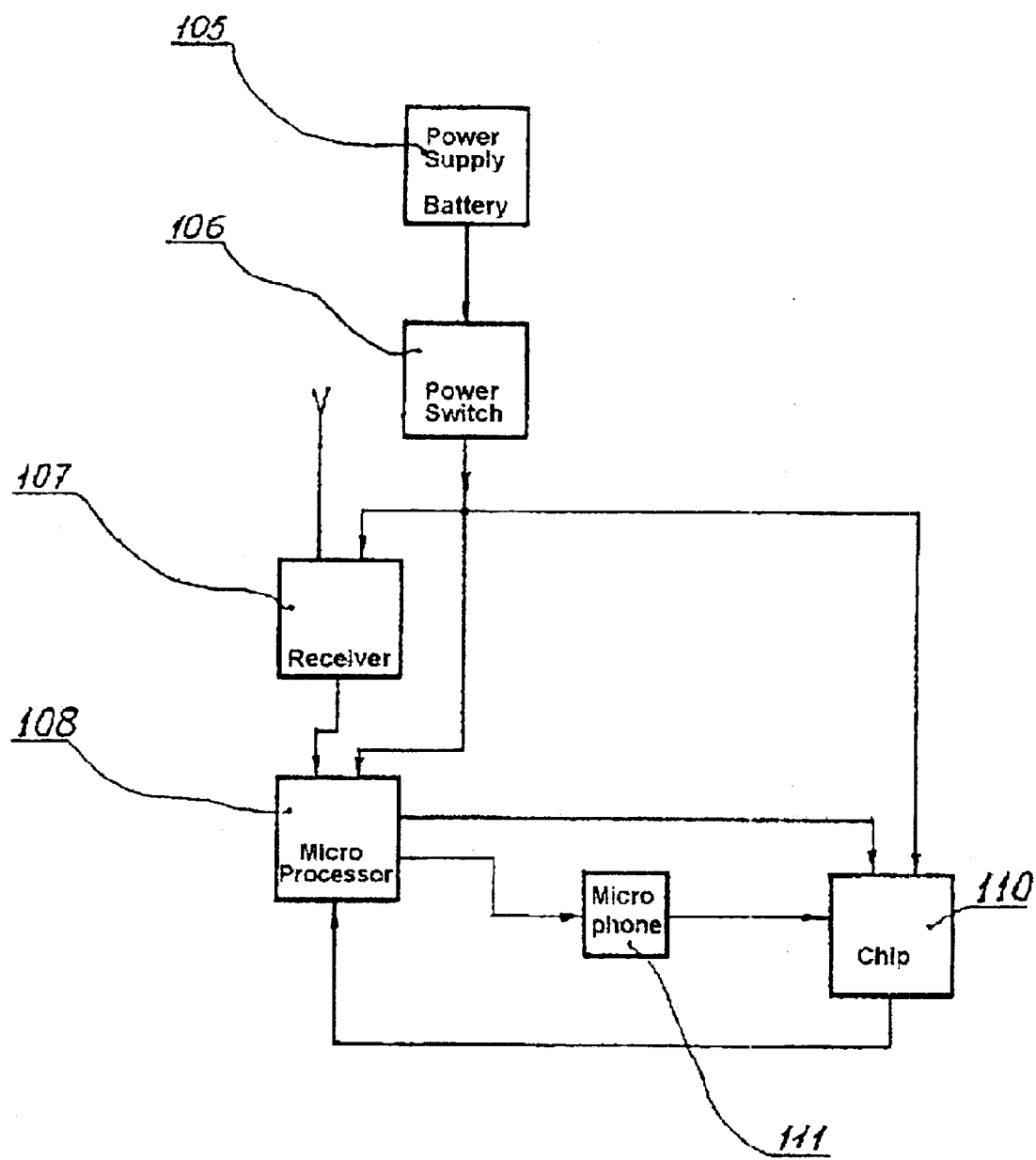
FIGS. 3 and 4 are diagrams illustrating the operation of the receiver.

Referring to FIG. 3, the commands are stored on the digital chip 110. First, the power supply of the battery 105 is applied to all the circuit components by turning on switch 106. Using the pushbuttons 203 and 204 (see FIG. 2), of the remote control panel, the code of the command will be sent that the user desires to store. The receiver 107 (see FIG. 3) will receive this code and apply the signal to the microprocessor 108 that will turn on the microphone 111 and set the chip 110 to the first position. The user then speaks the command into microphone 111.

After the command has been stored, chip 110 sends a signal to microprocessor 108 that a command has been stored. Using pushbuttons 203 and 204 of the remote control panel, the code of a second command can be sent; microprocessor 108 sets chip 110 to record the second command and turns on microphone 111. A number of commands can be stored in this manner, each with its own code.

Figure 4:
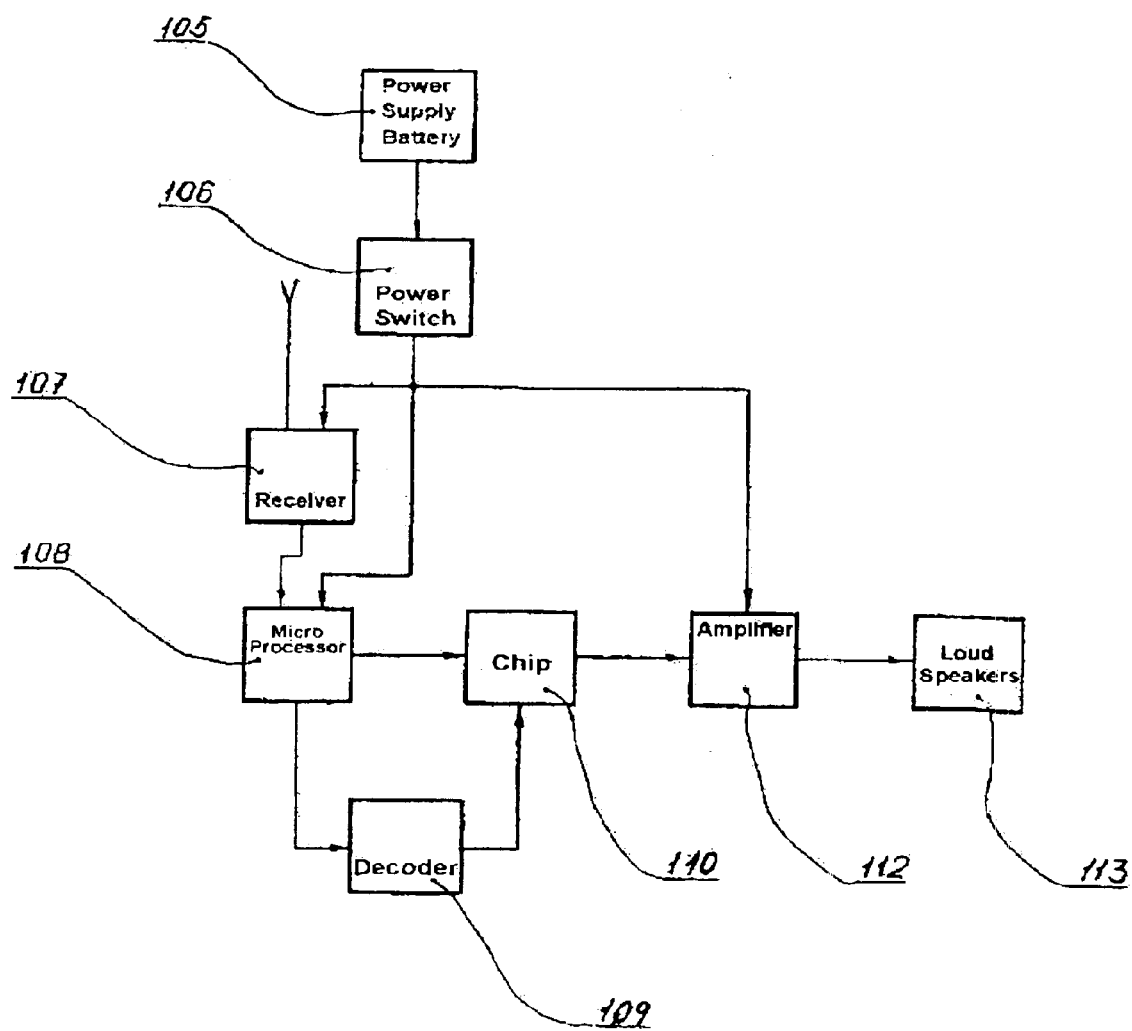

After all the desired commands have been stored, the system is ready to use. The collar is placed around the neck of a pet and switch 106 is turned on so that battery 105 energizes all the components of the circuit for generating audio signals (see FIG. 4).

Receiver 107 receives the coded signals from transmitter 102 and transfers them to microprocessor 108. Microprocessor 108 controls decoder 109 and chip 110. Decoder 109 decodes the signal and sets chip 110 to the position for the code used. The audio command that is stored on this position in chip 110 is sent to amplifier 112 and is then reproduced by loudspeaker 113.

Figure 5:
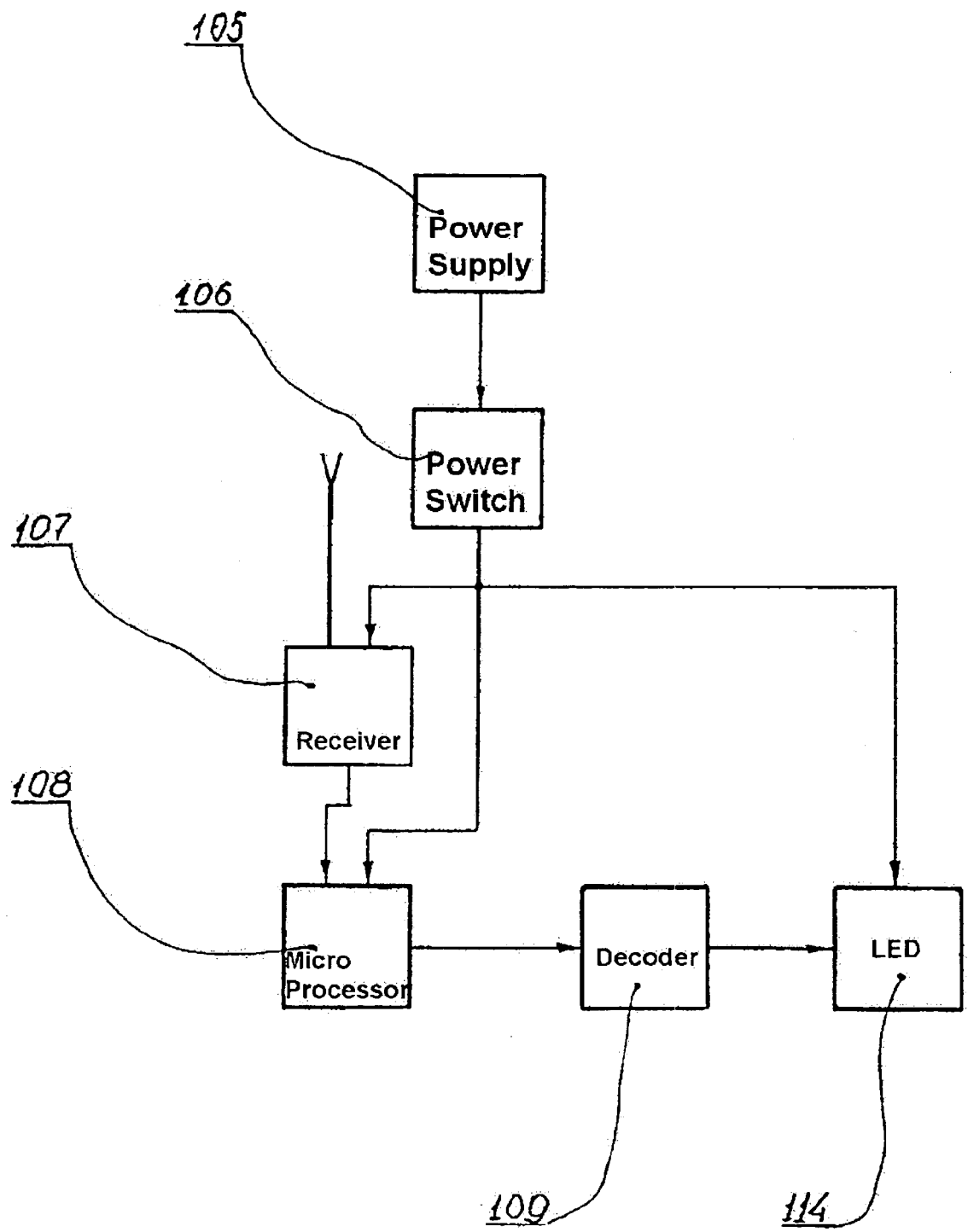
FIG. 5 is a diagram illustrating the operation of a receiver that can turn on lights.

To turn on LED 114 from the remote control panel a light signal code is transmitted to receiver 101 using pushbuttons 203 and 204 (see FIG. 5). The light signal is transferred to microprocessor 108, decoded by decoder 109, and LED 114 is turned on. Preferably, the operator can select either continuous or flashing lights. Alternatively, audio commands can be combined with light signals, so that a particular coded signal turns on both an audio command and a light.

What is claimed is:

1. A system for sending messages to a pet comprising
   (a) a transmitter that comprises
      (1) broadcasting means for broadcasting at least two signals; and
      (2) control means for turning said broadcasting means on and off; and
   (b) a receiver attachable to said pet that can receive said signals and comprises
      (1) at least one light that can be turned on by a signal from said transmitter;
      (2) a microphone;
      (3) electronic means for making at least one recording of a command spoken by a human voice into said microphone;
      (4) a switch for turning said electronic means on and off;
      (5) an amplifier for amplifying said recording; and
      (6) a speaker for converting said recording into sound, whereby a signal from said transmitter can turn on said recording and play it through said speaker.

2. A system according to claim 1 wherein said receiver is part of a collar that fits around the neck of said pet.

3. A system according to claim 2 wherein said pet is a dog.

4. A system according to claim 2 wherein an antenna is inside said collar.

5. A system according to claim 1 wherein said at least one light is a flashing light.

6. A system according to claim 1 wherein said at least one light is a light emitting diode.

7. A system according to claim 1 wherein said transmitter is powered by at least one battery.

8. A system according to claim 1 wherein said receiver is powered by at least one battery.

9. A system according to claim 1 wherein said signals are encoded and are decoded by said receiver.

10. A system according to claim 1 wherein said signals are radio signals.

11. A method of sending messages to a pet using a system according to claim 1 comprising turning said electronic means on, speaking at least one command into said microphone and turning said broadcasting means on.

12. A system according to claim 1 wherein said recording is digital.

13. A system according to claim 1 wherein said electronic means has at least two channels for recording commands.

14. A system for sending messages to a pet and for locating a pet comprising
  (A) a transmitter that comprises
    (1) broadcasting means for broadcasting a radio sound signal and a radio light signal;
    (2) control means for turning said broadcasting means on and off; and
    (3) at least one battery for powering said transmitter; and
  (B) a receiver in the form of a collar that comprises
    (1) at least one light;
    (2) a microphone;
    (3) electronic means for receiving said signals and for making a digital recording of a command spoken by a human voice into said microphone;
    (4) a switch for turning said electronic means on and off;
    (5) means for playing said recording when said radio sound signal is received;
    (6) means for amplifying said recording; and
    (7) a speaker for converting said amplified recording into sound;
    (8) means for turning on said at least one light when said radio light signal is received; and
    (9) at least one battery for powering said receiver.

15. A system according to claim 14 wherein said signals are encoded and said receiver includes a decoder for decoding them.

16. A method of sending messages to a pet using a system according to claim 14 comprising turning said electronic means on speaking at least one command into said microphone, and broadcasting a sound signal on said transmitter.

17. A method of locating a pet using a system according to claim 14 comprising broadcasting a light signal on said transmitter.

18. A system for sending messages to a dog and for locating a dog comprising
  (A) a transmitter that comprises
    (1) broadcasting means for broadcasting at least two encoded radio signals, including a sound signal and a light signal;
    (2) control means for selecting and broadcasting a particular signal; and
    (3) at least one battery for powering said transmitter; and
  (B) a receiver inside a collar suitable for placing around the neck of said dog, where said receiver comprises
    (1) means for receiving said encoded radio signals;
    (2) means for decoding said encoded radio signals;
    (3) a microphone;
    (4) electronic means having at least two channels for making digital recordings of commands spoken by a human voice into said microphone;
    (5) a switch for turning said electronic means on and off;
    (6) means for amplifying said recording;
    (7) a speaker for converting said amplified recording into sound;
    (8) means for turning on said recording when a sound signal is received;
    (9) at least one light emitting diode;
    (10) means for turning on said at least one light emitting diode when a light signal is received; and
    (11) at least one battery for powering said receiver.

19. A method of sending messages to a pet using a system according to claim 18 comprising turning said electronic means on, speaking at least one command into said microphone, and broadcasting a sound signal on said transmitter.

20. A method of locating a pet using a system according to claim 18 comprising broadcasting a light signal on said transmitter.

* * * * *